US011643201B2

(12) United States Patent
Vanni et al.

(10) Patent No.: US 11,643,201 B2
(45) Date of Patent: May 9, 2023

(54) VERTICAL TAKE-OFF AND/OR LANDING AIRCRAFT AND METHOD FOR CONTROLLING A FLOW OF A FLUID ALONG A FLUIDIC LINE OF A VERTICAL TAKE-OFF AND/OR LANDING AIRCRAFT

(71) Applicant: LEONARDO S.P.A., Rome (IT)

(72) Inventors: Roberto Vanni, Samarate (IT); Andrea Antoni, Samarate (IT)

(73) Assignee: LEONARDO S.P.A., Rome (IT)

( * ) Notice: Subject to any disclaimer, the term of this patent is extended or adjusted under 35 U.S.C. 154(b) by 179 days.

(21) Appl. No.: 17/312,301

(22) PCT Filed: Oct. 31, 2019

(86) PCT No.: PCT/IB2019/059359
§ 371 (c)(1),
(2) Date: Jun. 9, 2021

(87) PCT Pub. No.: WO2020/128661
PCT Pub. Date: Jun. 25, 2020

(65) Prior Publication Data
US 2022/0024572 A1    Jan. 27, 2022

(30) Foreign Application Priority Data

Dec. 20, 2018  (EP) ..................................... 18214922

(51) Int. Cl.
*B64C 29/00* (2006.01)
*B64C 1/26* (2006.01)
*B64C 27/00* (2006.01)

(52) U.S. Cl.
CPC ............ *B64C 29/0033* (2013.01); *B64C 1/26* (2013.01); *B64C 27/006* (2013.01)

(58) Field of Classification Search
CPC .......... B64C 1/26; B64C 1/32; B64C 27/006; B64C 3/56; B64C 3/546; B64C 29/0091;
(Continued)

(56) References Cited

U.S. PATENT DOCUMENTS 3,630,214 A * 12/1971 Levering .............. B64D 37/005
                                                137/68.14
3,921,656 A * 11/1975 Meisenheimer, Jr. .......................
                                                F16K 17/386
                                                137/75

(Continued)

*Primary Examiner* — Tien Q Dinh
*Assistant Examiner* — William L Gmoser
(74) *Attorney, Agent, or Firm* — Leason Ellis LLP

(57) ABSTRACT

A vertical take-off and/or landing aircraft comprising: a fuselage having a longitudinal axis; a pair of semi-wings protruding from the fuselage in a transversal direction with respect to the longitudinal axis; a pair of a predetermined breaking areas of the semi-wings defining respective preferred rupture sections at which the respective semi-wings are designed to break, during operation, in a controlled way moving along a preferred collapse trajectory in the event of impact; and at least one fluidic line configured to convey at least one service fluid from and/or towards at least one said semi-wing and crossing at least one of said preferred rupture sections; the aircraft comprises a self-sealing coupling movable between a first configuration in which it enables the flow of said service fluid from and/or towards the semi-wing, and a second configuration in which it prevents the above-mentioned flow and the spilling of the service fluid from the fluidic line; the self-sealing coupling is movable from the first to the second configuration via the movement of the semi-wing along the preferred collapse trajectory.

13 Claims, 6 Drawing Sheets

(58) Field of Classification Search
CPC .. B64C 1/062; B64C 1/28; B64C 1/30; B64C 1/063; B64D 37/32; B64D 37/005
See application file for complete search history.

(56) References Cited

U.S. PATENT DOCUMENTS

| | | | | |
|---|---|---|---|---|
| 4,090,524 | A * | 5/1978 | Allread | F16L 29/00 137/68.15 |
| 4,258,738 | A * | 3/1981 | Redman | B64D 37/005 137/68.14 |
| 4,328,822 | A * | 5/1982 | Wilhelm | F16L 55/1015 137/599.02 |
| 5,009,374 | A * | 4/1991 | Manfredi | F42B 3/006 102/378 |
| 5,067,690 | A * | 11/1991 | Bac | B64D 37/32 244/135 R |
| 6,149,102 | A * | 11/2000 | Marasco | B64D 37/02 244/135 R |
| 6,367,736 | B1 | 4/2002 | Pancotti | |
| 9,279,529 | B2 * | 3/2016 | Zhang | F16L 37/148 |
| 2015/0291290 | A1 | 10/2015 | Leachman | |
| 2018/0305037 | A1 | 10/2018 | Kooiman et al. | |
| 2019/0003511 | A1 * | 1/2019 | Leon | F16B 41/002 |

* cited by examiner

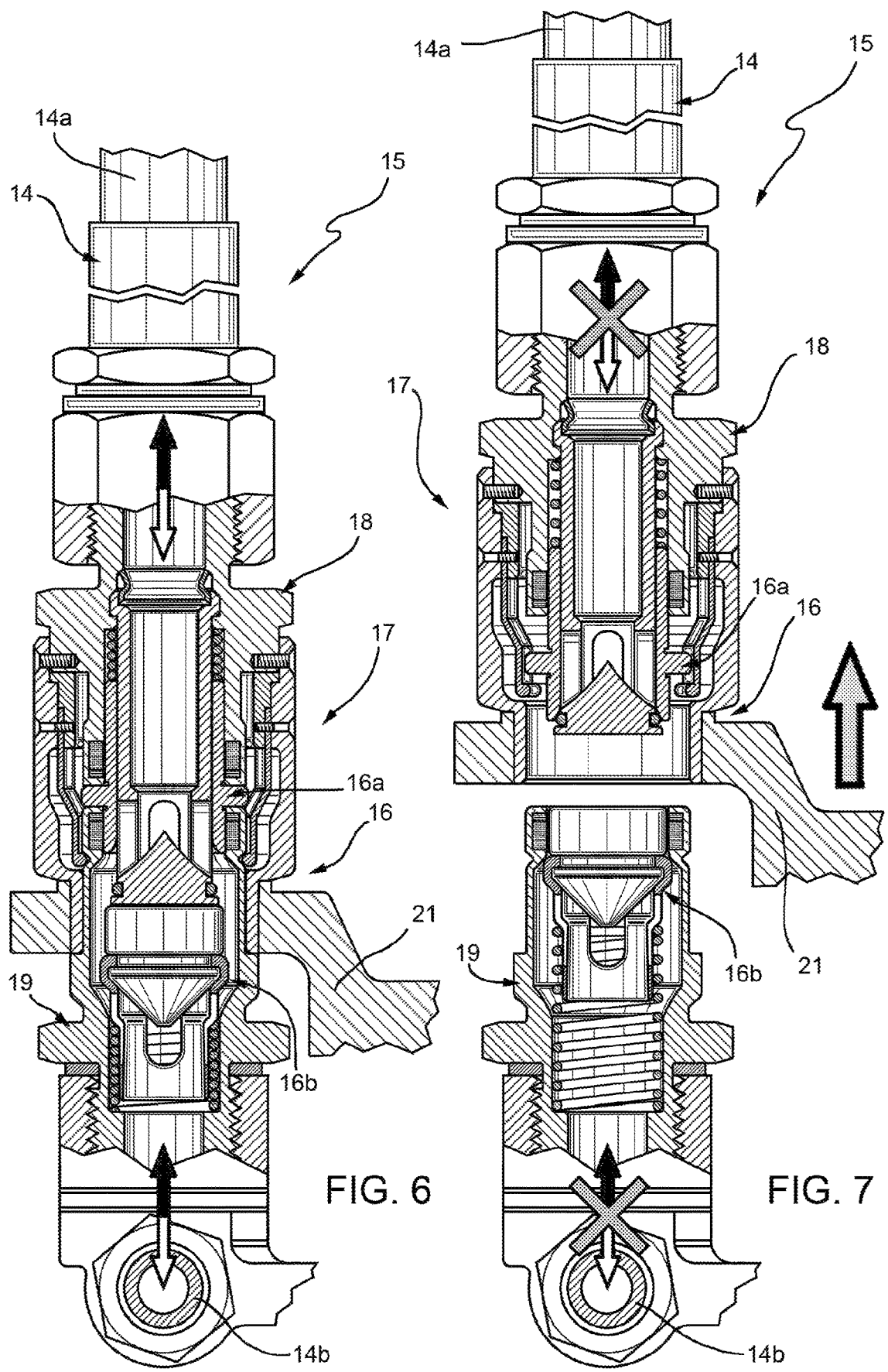

VERTICAL TAKE-OFF AND/OR LANDING AIRCRAFT AND METHOD FOR CONTROLLING A FLOW OF A FLUID ALONG A FLUIDIC LINE OF A VERTICAL TAKE-OFF AND/OR LANDING AIRCRAFT

CROSS-REFERENCE TO RELATED APPLICATIONS

This patent application is a U.S. National Phase Application under 35 U.S.C. § 371 of International Patent Application No. PCT/IB2019/059359, filed on Oct. 31, 2019, which claims priority from European patent application no. 18214922.9, filed on Dec. 20, 2018, all of which are incorporated by reference, as if expressly set forth in their respective entireties herein.

TECHNICAL FIELD

The present invention relates to a vertical take-off and/or landing aircraft, in particular to a convertiplane capable of taking and landing in a vertical direction.

The present invention further relates to a method for controlling a flow of a fluid along a fluidic line of a vertical take-off and/or landing aircraft.

BACKGROUND ART

Aircraft configured to take off and/or land in a vertical, or substantially vertical, direction are known. In particular, such aircraft do not require a thrust in a horizontal direction, with respect to the ground, for take-off or landing.

Aircraft of the above-mentioned type are known as VTOL (Vertical Take-Off and Landing) aircraft.

An example of such aircraft are convertiplanes, which are capable of selectively adopting:
- an "airplane" configuration, in which the rotors are arranged with the respective first axes substantially parallel to a second longitudinal axis of the convertiplane itself; or
- a "helicopter" configuration, in which the rotors are arranged with the respective first axes substantially vertical and transversal to the above-mentioned second longitudinal axis of the convertiplane.

Thanks to the possibility to tilt the rotors, convertiplanes are capable of taking off and landing like a helicopter, that is in a substantially perpendicular direction to the convertiplane's second longitudinal axis, with no need for a runway.

Moreover, convertiplanes are further capable of taking off and landing on rough terrain and without generating a noise level incompatible with an urban settlement.

In addition, convertiplanes are capable of hovering when arranged in the helicopter configuration.

Moreover, convertiplanes can reach and maintain a cruising speed of approximately 500 km/h and flight altitudes in the order of 7,500 metres, when arranged in the airplane configuration.

Such a cruising speed is far higher than the approximate 300 km/h value which defines the maximum cruising speed for helicopters.

Similarly, the above-mentioned altitude is far higher than that typical of helicopters and enables convertiplanes arranged in an airplane configuration to avoid clouds and atmospheric disturbances characteristic of lower altitudes.

Known convertiplanes essentially comprise:
- a fuselage which extends along the above-mentioned second longitudinal axis;
- a pair of semi-wings that cantilever from the respective opposite parts of the fuselage, along a third transversal axis which is substantially orthogonal to the second longitudinal axis; and
- a pair of nacelles holding respective rotors, which can be jointly tilted together with the rotors with respect to the related semi-wing about the related third transversal axis, which, furthermore, is orthogonal to the first axes of the rotors when the convertiplane is the helicopter configuration.

Each rotor comprises, in a known way, a shaft rotating about the related first axis and a plurality of blades pivoting on the shaft, in particular distributed circumferentially about the free end of the shaft that exits from the respective nacelle.

Another example of VTOL aircraft of the known type are the so-called helicoplanes or gyrodynes.

In detail, a helicoplane of the known type substantially consists of a helicopter which is further provided, besides the components generally present in a known helicopter, such as for example a main vertical axis rotor, with a pair of semi-wings that cantilever from the respective parts of the fuselage, along a transversal axis which is substantially orthogonal to the longitudinal axis of the aircraft and to the rotation axis of the main rotor.

In greater detail, each semi-wing carries a respective thrust propeller comprising, in a known way, a shaft which can be actuated by a related engine and a plurality of blades structured on the shaft itself.

In particular, each shaft is rotatable about a related axis which is substantially parallel to the longitudinal axis of the helicoplane, that is a horizontal axis.

Hence, the helicoplane is capable, in the same way as the convertiplane, of taking off and landing in a vertical direction using the main rotor, and of forward flight using the propellers and the above-mentioned semi-wings.

During forward flight, the main rotor spins in neutral, while the thrust is generated by the blades.

Regardless of the type of vertical take-off and/or landing aircraft, it is known in the field to envisage a predetermined breaking area for each semi-wing, at which the semi-wing, in the event of impact with the ground, breaks off from the fuselage in a controlled manner.

More precisely, each semi-wing is provided in a known way with a preferred rupture section, usually a specially weakened section of the semi-wing, along which the latter is configured to break and separate from the fuselage during ground impact.

A controlled separation of each semi-wing is thereby achieved, along a preferred collapse trajectory.

More in detail, each semi-wing is configured to fall downwards separating from the fuselage along the preferred rupture section. This device prevents the collapse of the semi-wing on the fuselage, thus avoiding damage to persons or payload occupying the fuselage.

The above is envisaged in the event of vertical impact of the aircraft, namely in case of vertical drop during take-off or landing, due to non-nominal operating conditions (for example, failure to deploy one or more landing gear).

It follows that such a vertical drop occurs at a horizontal forward velocity close to zero.

VTOL aircraft of the known type usually further comprise one or more tubes inside which respective service fluids flow during operation.

Generally, each of the above-mentioned tubes is adapted to convey a respective service fluid from and towards the corresponding semi-wing.

For example, in the case of the convertiplane, the tubes are part of the hydraulic circuits configured to convey a control fluid, usually pressurised oil, from and towards the tiltable nacelles, with the purpose of hydraulically controlling its tilt.

In greater detail, each tube connects a respective source arranged inside the fuselage, for example a hydraulic pump, with the related tilted nacelle arranged on the related semi-wing.

Consequently, each tube crosses the related semi-wing, and in particular the corresponding preferred rupture section.

In the above-mentioned case in which ground impact occurs, there may be a sudden break, or a detachment from the respective seats, of the tubes crossing the preferred rupture sections. Given that the hydraulic pumps of the above-mentioned circuits continue to feed fluid to the tubes in the immediate aftermath of the impact, a significant amount of fluid will spill from the broken tubes at a high pressure and, therefore, at a high speed, with the resulting spread of the service fluids.

The service fluids which are generally used are inflammable and can therefore cause fires or explosions following impact.

A need is therefore felt in the field to increase the safety of VTOL type aircraft during vertical take-off and landing phases, particularly reducing the risk of service liquid spillage from the respective tubes.

DISCLOSURE OF INVENTION

It is therefore an object of the present invention to provide a vertical take-off and/or landing aircraft which is designed to meet the above-mentioned need in a straightforward and low-cost manner.

According to the invention, this object is achieved by a vertical take-off and/or landing aircraft as claimed in claim 1.

A further object of the present invention is to implement a method for controlling a flow of a fluid along a fluidic line of the vertical take-off and/or landing aircraft which enables to satisfy the need described above simply and economically.

According to the invention, this object is achieved by a control method as claimed in claim 12.

BRIEF DESCRIPTION OF THE DRAWINGS

For a better understanding of the present invention, a preferred non-limiting embodiment thereof is illustrated, purely by way of example and with reference to the accompanying drawings, in which:

FIGS. 6 and 7 are side partly cross-sectional views, on an enlarged scale and with parts removed for the sake of clarity, of the detail of FIG. 4, during different operating conditions.

BEST MODE FOR CARRYING OUT THE INVENTION

Figure 1:
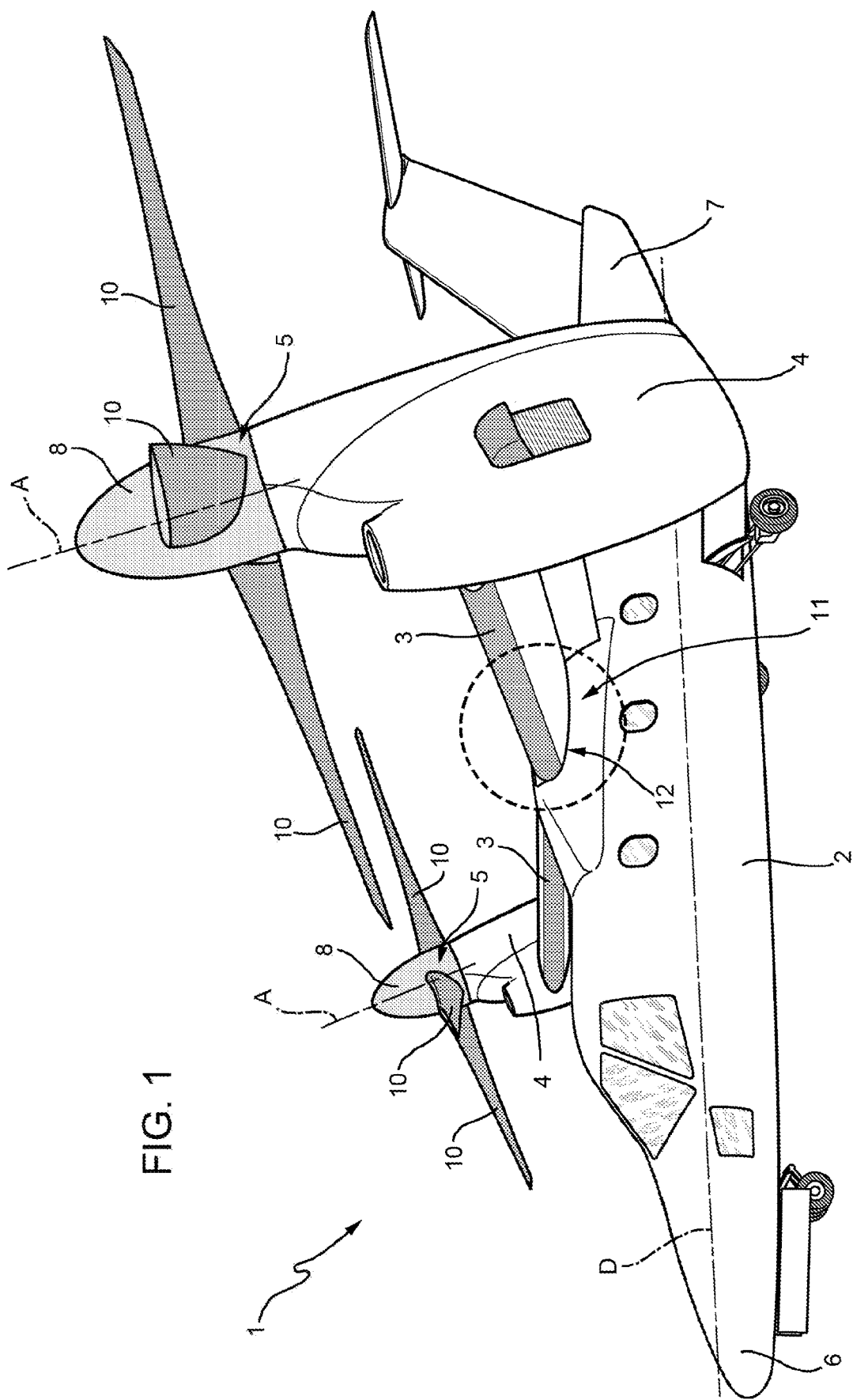
FIG. 1 is a perspective side view, with parts removed for the sake of clarity, of a vertical take-off and/or landing aircraft made according to the present invention, in particular a convertiplane.
Figure 2:
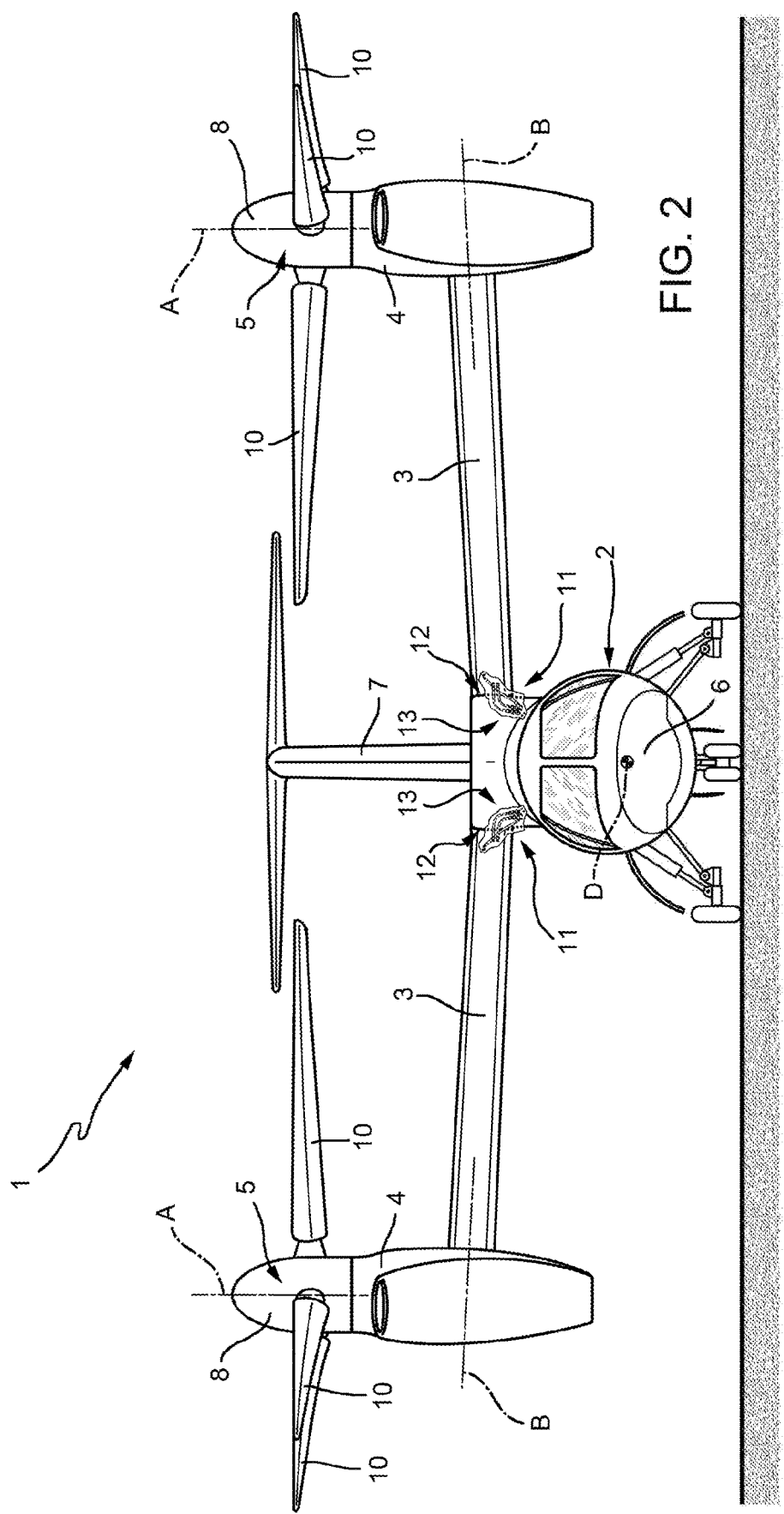
FIG. 2 is a front view, with parts removed for the sake of clarity, of the convertiplane of FIG. 1, during nominal operating conditions.
Figure 3:
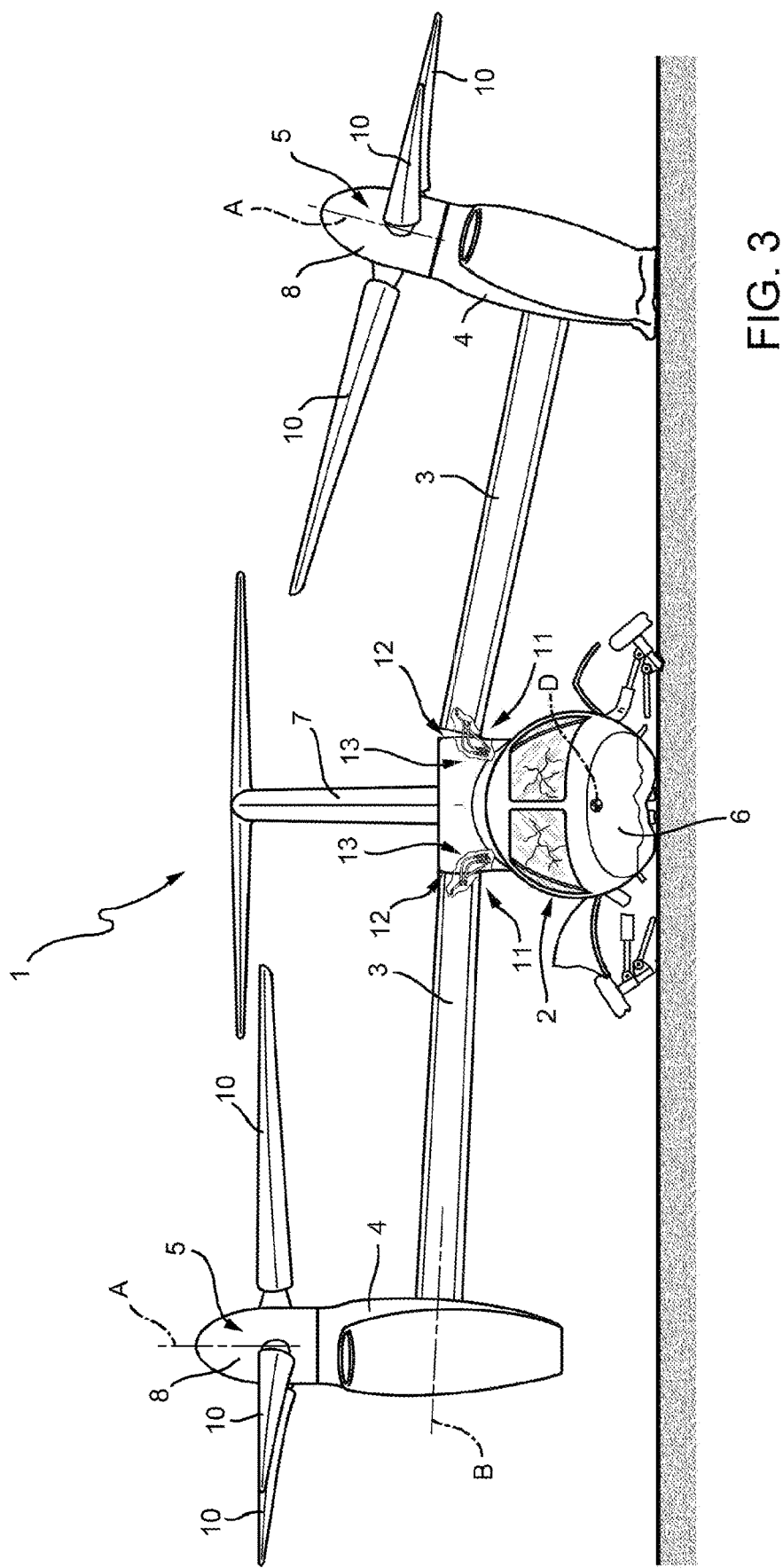
FIG. 3 is a front view, partly cross-sectional and with parts removed for the sake of clarity, of the convertiplane of FIG. 1, during non-nominal operating conditions, for example after ground impact.

With reference to FIGS. 1 to 3, a vertical take-off and/or landing aircraft is illustrated.

According to this preferred and non-limiting embodiment, the aircraft is a convertiplane designated as a whole by reference numeral 1 and capable of taking off and landing in a vertical, or substantially vertical, direction.

The convertiplane 1 is capable of taking off and landing like a helicopter, with no need for a long runway.

The convertiplane 1 essentially comprises:
a fuselage 2 having a longitudinal axis D;
a pair of semi-wings 3 that cantilever from the respective opposite parts of the fuselage 2 and transversally to the longitudinal axis D; and
a pair of nacelles 4 housing related rotors 5.

The fuselage 2 comprises, a nose 6 arranged in the front portion, and a tail portion 7, which are opposite each other along the longitudinal axis.

It is specified that the terms "front", "tail", "longitudinal", "lateral" and similar ones used in the present description refer to a normal movement direction of the convertiplane 1 during flight.

In greater detail, each rotor 5 essentially comprises:
an engine which is not shown;
a shaft which is not shown and rotating about an axis A;
a hub 8 which is driven to rotate by the shaft; and
a plurality of blades 10 pivoting on the hub 8, in particular distributed circumferentially with respect to the axis A on the hub 8.

The nacelles 4 are tiltable integrally with the rotors 5 about an axis B relative to the semi-wings 3.

Axis B is transversal to the longitudinal axis and to axes A. The semi-wings 3 extend substantially along axis B.

The convertiplane 1 can be selectively arranged:
in a "helicopter" configuration in which axes A of the rotors 5 are orthogonal to the longitudinal axis and to axis B (FIG. 2); and
in an "airplane" configuration (not visible) in which axes A of the rotors 5 are parallel to the longitudinal axis and orthogonal to axis B.

Given that the semi-wings 3 are identical, for the sake of brevity, a single semi-wing 3 of the convertiplane 1 will be mentioned below.

However, the structural and functional characteristics described and indicated below are applicable in the same way to the other semi-wing 3 of the convertiplane 1.

The convertiplane 1 further comprises a predetermined breaking area 11 of the semi-wing 3 defining a respective preferred rupture section 12 at which the semi-wing 3 breaks in a controlled way moving along a preferred collapse trajectory in the event of impact, in particular in case of ground impact.

In particular, the breaking area 11 is arranged in the area where the semi-wing 3 and the fuselage 2 intersect.

Consequently, the semi-wing 3 is designed to break, that is to separate, from the fuselage 2 along the rupture section 12 defined by the breaking area 11, carrying out the above-mentioned movement along the preferred collapse trajectory.

Preferably, the rupture section 12 is a weakened section of the semi-wing 3, at which a breaking of the latter is configured to start and continue along a rupture path extending along the semi-wing profile, in particular from top to bottom, transversally to axis B.

More specifically, the separation movement along the collapse trajectory occurs, during operation, following impact, for example following a vertical drop during take-off or landing, at a horizontal forward velocity close to zero.

In particular, the semi-wing 3 is designed to break off from the fuselage 2 along the rupture section 12 and to rotate downwards with the respect to the latter, until it touches ground at its free end portion, thus avoiding or at least limiting damages to persons or payload occupying the fuselage 2.

In view of the above description, the preferred collapse trajectory is defined by a substantially rotational motion of the semi-wing 3 about an axis lying on the rupture section 12 between a starting position, corresponding to the nominal position of normal operation of the semi-wing 3 and illustrated in FIG. 2, and a final position, corresponding to the setting on the ground of the broken semi-wing 3 and illustrated in FIG. 3.

As is visible in FIGS. 2 to 5, the convertiplane 1 further comprises a fluidic line 13 configured to convey at least one service fluid from and/or towards the semi-wing 3.

In detail, the fluidic line 13 comprises at least one tube 14 configured to convey a control fluid, for example pressurised oil, inside the semi-wing 3, in particular from and towards the nacelle 4, with the purpose of hydraulically controlling its tilt with respect to axis B.

In greater detail, the tube 14 comprises a segment 14a extending at the semi-wing 3, in particular inside the semi-wing 3, and a segment 14b which extends at the fuselage 2, in particular inside the fuselage 2.

Advantageously, the convertiplane 1, in particular the fluidic line 13, is provided with a self-sealing coupling 15 configured to fluidly connect the segment 14a and the segment 14b and to enable or to interrupt the flow of the control fluid between the segment 14a and the segment 14b.

In detail, the self-sealing coupling 15 is controllable between:
  a first configuration, in which it enables the flow of the control fluid from and/or towards the semi-wing 3 and therefore fluidly connects the segment 14a and the segment 14b and enables the flow of the control fluid between the segment 14a and the segment 14b; and
  a second configuration, in which it prevents the above-mentioned flow and the spilling of the control fluid from the fluidic line 13, and therefore in which the segment 14a and the segment 14b are fluidly disconnected and the flow of control fluid between the segment 14a and the segment 14b is prevented.

In greater detail, when the self-sealing coupling 15 is in the second configuration, it prevents a spilling of the control fluid from the segment 14a and/or from the segment 14b.

According to the invention, the self-sealing coupling 15 is movable from the first configuration to the second configuration through the above-mentioned movement of the semi-wing 3 along the preferred collapse trajectory.

Preferably, the self-sealing coupling 15 is a Stratoflex Slide-Lok coupling and is described below in so far as is necessary to the comprehension of the present invention.

With reference to FIGS. 6 and 7, the self-sealing coupling 15 further comprises a coupling device 17 configured to fluidly connect the segment 14a with the segment 14b.

In detail, the coupling device 17 comprises:
  a first coupling element, in particular a hose coupling 18 carried by the segment 14a, even more in particular fixed to a free end of the segment 14a;
  a second coupling element, in particular a hose coupling 19 carried by the segment 14b, even more in particular fixed to a free end of the segment 14b fluidly facing the above-mentioned free end of the segment 14a.

In greater detail, the hose coupling 18 can be releasably coupled to the hose coupling 19 in order to fluidly connect the segment 14a with the segment 14b.

More specifically, the coupling device 17 is selectively movable to:
  an operating position, illustrated in FIG. 6, in which the hose coupling 18 is coupled to the hose coupling 19; and
  a rest position, illustrated in FIG. 7, in which the hose coupling 18 is decoupled from the hose coupling 19.

The self-sealing coupling 15 further comprises a valve device 16, housed inside the coupling device 17 and movable so as to prevent the flow of the control fluid from and/or towards the semi-wing 3, more specifically to prevent the flow of the control fluid between the segment 14a and the segment 14b of the tube 14.

In the specific example, the valve device 16 is movable between:
  an open position, in which it allows the flow of the control fluid between the segment 14a and the segment 14b; and
  a closed position, in which it prevents the flow of the control fluid between the segment 14a and the segment 14b.

More specifically, when the valve device 16 is in the closed position, it prevents the spilling of the control fluid from the segment 14a and/or from the segment 14b.

In this regard, the valve device 16 comprises a first valve element 16a adapted to seal (that is close in a fluid-tight manner) the segment 14a and a second valve element 16b adapted to seal (that is close in a fluid-tight manner) the segment 14b.

In a known way, the valve device 16 is arranged, in use, in the open position when the coupling device 17 is in the operating position, that is when the hose coupling 18 and the hose coupling 19 are coupled to one another, and in the closed position when the coupling device 17 is in the rest position, that is when the hose coupling 18 and the hose coupling 19 are decoupled from one another.

In particular, such an arrangement of the valve device occurs automatically following the coupling or decoupling between the hose coupling 18 and the hose coupling 19, according to a known manner characteristic of the self-sealing couplings of the type described above and not illustrated in detail.

In other words, when the hose couplings 18 and 19 are coupled, the fluid flows between the segments 14a and 14b (FIG. 6). On the other hand, when the hose couplings 18 and 19 are decoupled, the fluid cannot spill from the segments 14a and 14b (FIG. 7).

According to this preferred and non-limiting embodiment, the self-sealing coupling 15 comprises spring mechanisms that are configured to arrange the valve device 16, and in particular the first valve element 16a and the second valve element 16b, from the open position to the closed position when the coupling device 17 is arranged from the operating position to the rest position.

In greater detail, the first valve element 16a is defined by a hose coupling housed inside the hose coupling 18 and movable between:
- a rest position, in which it is pushed, through the restoring force of a special elastic body, against a sealing element integral with the hose coupling 18, preventing the spilling/entry of the fluid from/into the hose coupling 18 and therefore out of/into the segment 14a; and
- an operating position, in which is pushed by the hose coupling 19 far away from the sealing element, enabling the spilling/entry of the fluid from/into the hose coupling 18 and therefore out of/into the segment 14a.

Similarly, the second valve element 16b is defined by a hose coupling housed inside the hose coupling 19 and movable between:
- a rest position, in which it is pushed, through the restoring force of a special elastic body, against a constriction of the hose coupling 19, preventing the spilling/entry of the fluid from/into the hose coupling 19 and therefore out of/into the segment 14b; and
- an operating position, in which it is pushed by the sealing element of the hose coupling 18 far away against the restoring force of the related elastic body, enabling the spilling/entry of the fluid from/into the hose coupling 19 and therefore out of/into the segment 14b.

The valve device 16 is movable, in use, through the above-mentioned movement of the semi-wing 3 along the above-mentioned preferred collapse trajectory, in order to prevent the flow of the control fluid from and/or towards the semi-wing 3, in particular inside the self-sealing coupling 15 and, therefore, inside the tube 14.

Moreover, the coupling device 17 is movable, during operation, from said operating position to said rest position through the above-mentioned movement of the semi-wing 3 along the above-mentioned preferred collapse trajectory.

Conveniently, the convertiplane 1 comprises a driving device 20 configured to activate the valve device 16 so as to prevent the flow of the control fluid from and/or towards the semi-wing 3 along the tube 14.

Moreover, the driving device 20 is also configured to control the arrangement of the coupling device 17 from the operating position to the rest position.

In detail, the driving device 20 is configured to transmit the above-mentioned movement of the semi-wing 3 along the preferred collapse trajectory to the self-sealing coupling 15 and, therefore, to the valve device 16 and to the coupling device 17.

More specifically, the driving device 20 comprises (FIG. 4):
- a control appendix 21, fixed, in particular assembled, to the hose coupling 18; and
- a rigid bar 22 rigidly assembled to the semi-wing 3, at its end portion 22a, and coupled, in particular hinged, to the control appendix 21, at its end portion 22b, opposite to the end portion 22a.

In practice, the bar 22 transmits the above-mentioned movement of the semi-wing 3 to the control appendix 21. In view of the above description, the driving device 20 defines a lever body, which transforms the rotational motion of the semi-wing 3 into a substantially translational motion of the control appendix 21 fixed to the hose coupling 18. Such a movement draws the hose coupling 18 and the hose coupling 19 apart.

In this way, the decoupling of the hose couplings 18 and 19 and the actuation of the valve device 16 following the dropping of the semi-wing resulting from its breaking along the preferred rupture section 12, are determined. In view of the above description, the driving device 20 is configured to simultaneously control the decoupling of the hose coupling 18 from the hose coupling 19 and the actuation of the valve device 16.

In this way, when the semi-wing 3 moves along the preferred collapse trajectory, the segment 14a of the tube 14 is decoupled from the segment 14b and the flow of the control fluid between the two and the spilling of the same from the two are almost instantly interrupted through the closing of the valve device 16.

Figure 4:
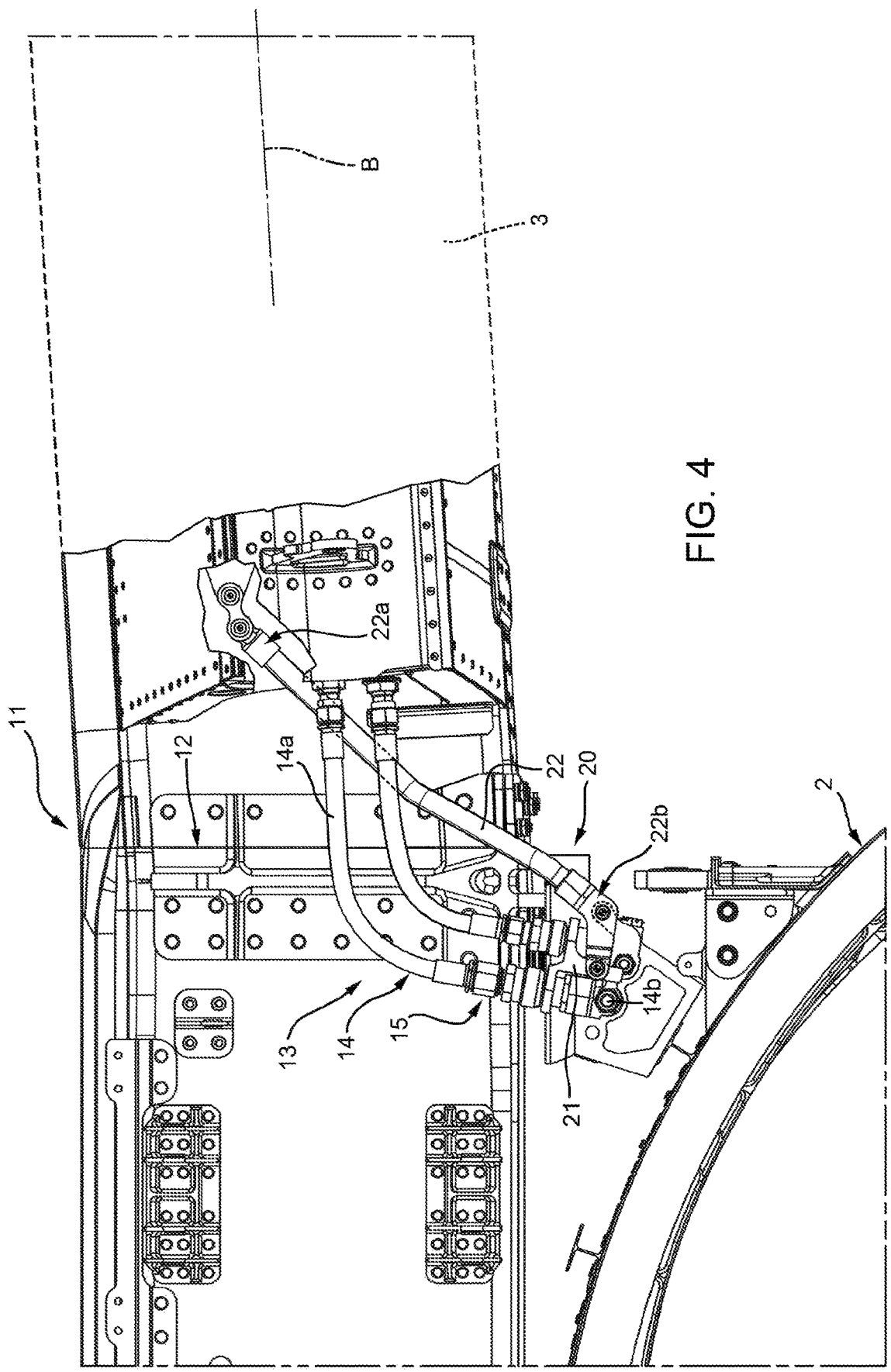
FIG. 4 is a front view, on an enlarged scale and with parts removed for the sake of clarity, of some details of the aircraft of FIG. 1, during nominal operating conditions.
Figure 5:
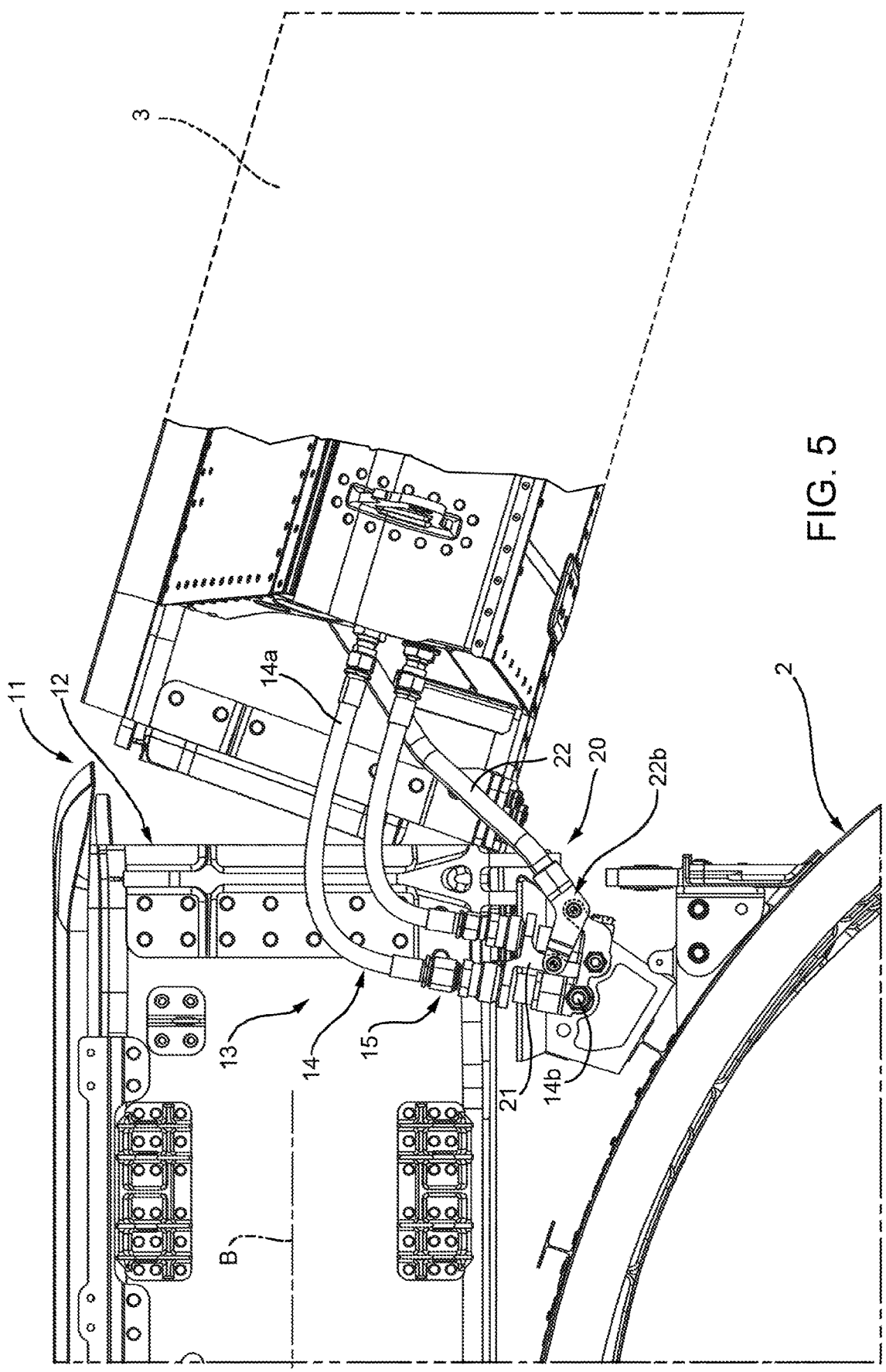
FIG. 5 is a front view, on an enlarged scale and with parts removed for the sake of clarity, of the detail of FIG. 4, during a wing detachment phase following impact.

The operation of the convertiplane 1 according to the present invention will be described below, with particular reference to a starting condition in which the convertiplane 1 has undergone a ground impact with a substantially vertical speed and the semi-wing 3 is breaking along the rupture section 12, separating from the fuselage 2 and collapsing along the preferred collapse trajectory (FIG. 4).

In such a condition, the coupling device 17 is in the operating position and the valve device 16 is in the open position; therefore the segment 14a is fluidly connected with the segment 14b (FIG. 6).

The bar 22 transmits the rotational motion of the semi-wing 3 to the hose coupling 18 of the coupling device 17, through the control appendix 21. Thanks to the lever body defined by the hinged coupling of the bar 22 with the control appendix 21, the rotational movement of the semi-wing 3 is transformed into a translational motion of the control appendix 21 itself and, hence, of the hose coupling 18, to which the control appendix 21 is rigidly assembled.

The movement of the semi-wing 3 thereby results in the arrangement of the coupling device 17 from the operating position to the rest position.

Moreover, according to a known characteristic mode of the self-sealing couplings, the movement of the first valve element 16a and of the second valve element 16b of the valve device 16 from the open position to the closed position is determined.

Therefore, the flow of control fluid between the segment 14a and the segment 14b of the tube 14 is interrupted.

Moreover, the spilling of the control fluid from the segment 14a and the segment 14b are prevented, significantly reducing the risk of fire on board.

The examination of the characteristics of the convertiplane 1 and of the method implemented according to the present invention highlight the advantages that they enable to obtain.

In particular, the rotation of the semi-wings 3 in case of impact determines the movement of the respective self-sealing couplings 15 between the first and the second configuration.

In this way, the spilling of the control fluid from the tube 14 is automatically prevented should there be an accident at take-off/landing.

Therefore, the risk of fire resulting from the spreading of service fluids following non-nominal take-off or landing is significantly reduced, thereby increasing the safety of the convertiplane 1 during the take-off and landing phases.

The invention is particularly applicable to convertiplanes and helicoplanes, since in these aircraft there is the need to convey service fluids from and towards the semi-wings 3 to feed the rotors 5 and, therefore, tubes shall be present in the respective breaking areas.

Thus, it is possible to facilitate the certification of the convertiplane 1.

It is clear that modifications and variations can be made to the convertiplane 1 described and illustrated herein without thereby departing from the scope of protection defined by the claims.

In particular, the fluidic line 13 may comprise more than one tube 14.

Moreover, the driving device 20 may comprise a flexible cable instead of the bar 22. In this case, the required tension of the flexible cable during the movement of the semi-wing 3 would be ensured by a special pulley system.

In addition, the aircraft may be a helicoplane or a gyrodyne.

The invention claimed is:

1. A vertical take-off and/or landing aircraft (1) comprising:
   a fuselage (2) having a longitudinal axis (D);
   a pair of semi-wings (3) protruding from said fuselage (2) in a transversal direction with respect to said longitudinal axis (D);
   a pair of predetermined breaking areas (11) of said semi-wings (3) defining respective preferred rupture sections (12) at which the respective semi-wings (3) are designed to break, in use, in a controlled way moving, in use, along a preferred collapse trajectory in the event of impact; and
   at least one fluidic line (13) configured to convey at least one service fluid from and/or towards at least one said semi-wing (3) and crossing at least one of said preferred rupture sections (12);
   a self-sealing coupling (15) movable between a first configuration in which it enables the flow of said service fluid from and/or towards said at least one semi-wing (3), and a second configuration in which it prevents said flow and the spilling of said service fluid from said fluidic line (13);
   said self-sealing coupling (15) being movable from said first configuration to said second configuration through the movement of said semi-wing (3) along said preferred collapse trajectory; and
   a driving device (20), configured to transmit said movement of said at least one semi-wing (3) along said preferred collapse trajectory to said self-sealing coupling (15), so as to control the movement of said self-sealing coupling (15) from said first configuration to said second configuration.

2. The aircraft according to claim 1, wherein said driving device (20) comprises:
   a control appendix (21) fixed to said self-sealing coupling (15) and movable to cause the movement of said self-sealing coupling (15) from said first configuration to said second configuration; and
   a connection element (22) operationally interposed between said at least one semi-wing (3) and said control appendix (21) and configured to transform said movement of said at least one semi-wing (3) along said preferred collapse trajectory into the movement of said control appendix (21).

3. The aircraft according to claim 2, wherein said movement of said at least one semi-wing (3) comprises a substantially rotational motion of said at least one semi-wing (3) about an axis lying on said preferred rupture section (12);
   said connection element (22) being configured to transform said substantially rotational motion of said semi-wing (3) into a substantially translational motion of said control appendix (21) to move said self-sealing coupling (15) from said first configuration to said second configuration.

4. The aircraft according to claim 2, wherein said connection element (22) is fixed to said at least one semi-wing (3) at its first end portion (22a), and is hinged to said control appendix (21) at its second end portion (22b).

5. The aircraft according to claim 2, wherein said connection element (22) is a rigid element or a flexible element.

6. The aircraft according to claim 1, wherein said fluidic line (13) comprises a first segment (14a) extending at said semi-wing (3) and a second segment (14b) extending at said fuselage (2);
   said self-sealing coupling (15) comprising a valve device (16) movable between:
      an open position, in which it allows said flow of said service fluid between said first segment (14a) and said second segment (14b); and
      a closed position, in which it prevents said flow of said service fluid between said first segment (14a) and said second segment (14b);
   said valve device (16) being arranged in said open position when said self-sealing coupling (15) is in said first configuration, and being arranged in said closed position when said self-sealing coupling (15) is in said second configuration.

7. The aircraft according to claim 6, wherein said self-sealing coupling (15) further comprises a coupling device (17) configured to fluidly connect said first segment (14a) to said second segment (14b) and comprising a first coupling element (18) carried by said first segment (14a) and a second coupling element (19) carried by said second segment (14b);
   said coupling device (17) being movable between:
      an operating position, in which said first coupling element (18) is coupled with said second coupling element (19); and
      a rest position, in which said first coupling element (18) is decoupled from said second coupling element (19);
   said coupling device (17) being arranged in said operating position when said self-sealing coupling (15) is in said first configuration, and being arranged in said rest position when said self-sealing coupling (15) is in said second configuration.

8. The aircraft according to claim 2, wherein said control appendix (21) is fixed to one of said first coupling element (18) and second coupling element (19) and can be actuated by said connection element (22) to determine the removal of said one of said first coupling element (18) and second coupling element (19) from the other of said first coupling element (18) and second coupling element (19) and thus moving said self-sealing coupling (15) from said first configuration to said second configuration.

9. The aircraft according to claim 1, wherein each preferred rupture section (12) is arranged in an intersection area between the related semi-wing (3) and said fuselage (2);
   said semi-wing (3) being configured to separate from said fuselage (2) along said preferred rupture section (12) moving along said preferred collapse trajectory.

10. The aircraft according to claim 1, wherein said aircraft (1) is a convertiplane or a helicoplane.

11. A method for controlling a flow of a service fluid inside a fluidic line (13) of a vertical take-off and/or landing aircraft (1);

said aircraft (1) comprising:

a fuselage (2) having a longitudinal axis (D);

a pair of semi-wings (3) protruding from said fuselage (2) in a transversal direction with respect to said longitudinal axis (D);

a pair of a predetermined breaking areas (11) of said semi-wings (3) defining respective preferred rupture sections (12) at which the respective semi-wings (3) are designed to break, in use, in a controlled way moving along a preferred collapse trajectory in the event of impact; and at least one fluidic line (13) configured to convey at least one service fluid from and/or towards at least one said semi-wing (3) and crossing at least one of said preferred rupture sections (12);

wherein the method comprises the steps of:

moving a self-sealing coupling (15) between a first configuration, in which it enables the flow of said service fluid from and/or towards said at least one semi-wing (3), and a second configuration, in which it prevents said flow and the spilling of said service fluid from said fluidic line (13), through said movement of said at least one semi-wing (3) along said preferred collapse trajectory; and transmitting said movement of said at least one semi-wing (3) along said preferred collapse trajectory to said self-sealing coupling (15) through a driving device (20).

12. The method according to claim 11, wherein said driving device (20) comprises:

a control appendix (21) fixed to said self-sealing coupling (15); and a connection element (22) operationally interposed between said at least one semi-wing (3) and said control appendix (21);

wherein the method further comprises the steps of:

translating said control appendix (21) to cause the movement of said self-sealing coupling (15) from said first configuration to said second configuration; and transforming said movement of said semi-wing (3) along said preferred collapse trajectory into the translation of said control appendix (21) via said connection element (22), and/or wherein the step of moving said self-sealing coupling (15) comprises the step of:

arranging a valve device (16) from an open position, in which it allows said flow of said service fluid from and/or towards said semi-wing (3), to a closed position, in which it prevents said flow and said spilling from said fluidic line (13), through the translation of said control appendix (21).

13. The method according to claim 12, wherein said self-sealing coupling (15) comprises a first coupling element (18) and a second coupling element (19), coupled to each other when said self-sealing coupling (15) is arranged in said first configuration and decoupled when said self-sealing coupling (15) is arranged is said second configuration;

wherein the step of moving said self-sealing coupling (15) comprises the step of:

decoupling said first coupling element (18) and said second coupling element (19) through the translation of said control appendix (21).

* * * * *